UNITED STATES PATENT OFFICE.

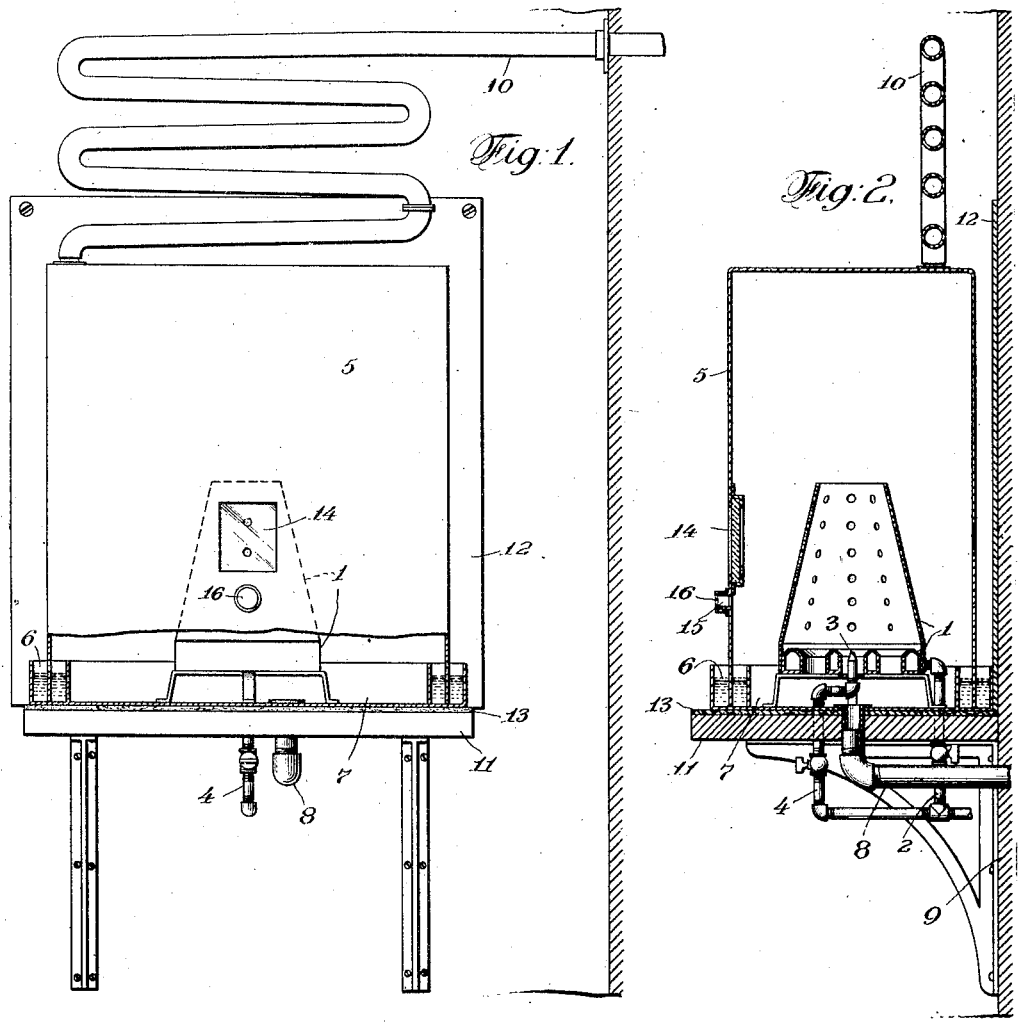
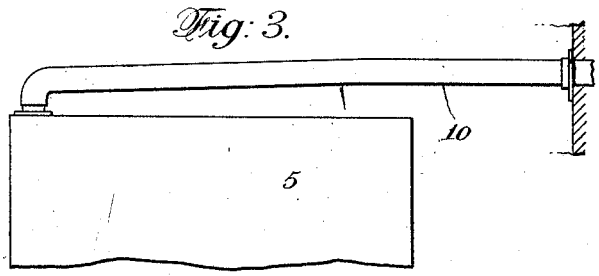

VAN RENSSELAER LANSINGH, OF NEW YORK, N. Y.

HEATER.

1,058,988.

Specification of Letters Patent.    Patented Apr. 15, 1913.

Application filed January 8, 1910. Serial No. 536,960.

*To all whom it may concern:*

Be it known that I, VAN RENSSELAER LANSINGH, a citizen of the United States, and a resident of New York city, borough of Brooklyn, in the county of Kings and State of New York, have invented certain new and useful Improvements in Heaters, of which the following is a specification.

My invention relates to improvements in heaters.

The device of my invention is designed particularly for heating garages or other places where there may be any explosive vapors, gases or other combustible materials, and the main object of the invention is to insure against the heater igniting the vapors or fumes in the garage.

Other objects of the invention will appear as the specification proceeds.

Garages, and especially those of private residences, usually consist of a single compartment, which, for reasons of fire protection, is isolated more or less from the other buildings, and on account of this isolation the satisfactory heating of such a garage has heretofore been a considerable problem, and in so far as I am aware, no satisfactory means for heating a garage of this character has as yet been devised. On account of the isolation from the residence or main building, it is impractical to heat the garage with steam or hot water derived from the heating system of such main building, and on account of the danger of explosion it is impracticable to use any kind of a heater wherein there is an exposed flame or exposed incandescent member. For this reason any kind of a heater which imparts its heat by convection is unsuitable for this purpose.

In its preferred form, the invention comprises a heater which is situated in the chamber to be heated, and a gas-tight casing which entirely incloses the heater, so that the heater is in reality completely inclosed in a closed chamber within the compartment to be heated. The heater may, if desired, be irremovably sealed within the protective casing, but I prefer, however, to make the casing in separable parts so as to permit access to the heater. For this reason I preferably make the casing in two parts, a bottom upon which the heater is supported, and a hood coöperating with the bottom and inclosing the heater. For the purpose of providing a gas-tight joint between the two parts of the casing, I preferably provide a water seal in the form of a trough or channel way extending around the edge of the bottom and into which the hood dips. The heater *per se* may be of any suitable construction. I find a gas burner well adapted for this purpose and in order to permit combustion of the gas within the closed compartment, I provide a fresh air inlet and an exhaust air outlet extending from the closed casing to points outside the compartment to be heated.

Another feature of my invention consists in combining with a heater adapted to heat by convection, a casing inclosing the heater and adapted to transmit the heat by radiation.

In the accompanying drawings there are illustrated several preferred embodiments of the invention, but it will be understood that various changes and modifications may be made therein without departing from the spirit and scope of the invention.

In the drawings: Figure 1 is a front view of the heater as supported against the wall of a building or compartment. Fig. 2 is a vertical sectional view of the heater taken on a plane at right angles to Fig. 1. Fig. 3 is a broken detail view of a slight modification of the invention.

Like reference characters denote corresponding parts throughout the several views.

The heater is here shown in the form of a gas burner 1, provided with a suitable gas supply pipe 2, and for convenience in lighting the burner, it may be provided with a pilot light 3, fed by a suitable branch pipe 4. The gas-tight casing for inclosing the heater is here shown in the form of a hood 5, completely inclosing the heater, the lower edge of which dips into a trough or channel way 6, extending around the edge of the pan 7. This trough is filled with a suitable sealing fluid, such as water, so that in this way the heater is completely sealed within the casing. Instead of using an ordinary pan, I prefer to make the supporting pan substantially as shown, with a water trough only around the edge thereof so that the heater may be supported on the dry bottom of the pan, without coming into contact with the sealing fluid.

While I have shown the heater in the form of a gas burner, it will be understood that any other suitable heating medium may be employed. When a gas burner is used, however, it is necessary to provide a certain amount of air to support the combustion of the gas. This I accomplish by providing a fresh air inlet 8, leading from a point outside the wall 9 of the garage or other building to the burner within the casing, and in addition to the fresh air inlet there is an exhaust air conduit 10, leading from the upper portion of the casing to a point outside the chamber to be heated. This exhaust air outlet may be arranged in zigzag or convolute form, so as to act as a radiating medium as well as an outlet for the burned gases. If found desirable, however, this exhaust air outlet may extend in a straight or substantially straight line, direct to the outer air, substantially as shown in Fig. 3. The exhaust air outlet has an adjustable connection with the hood so as not to interfere with the removal of the hood from the pan. This adjustable connection may be made in any suitable fashion, as by means of a section of flexible hose or by means of some separable connection such as a slip joint, as indicated in Figs. 1 and 3.

The heating device may be supported in any suitable manner, such as on a shelf 11, on the wall of the garage. A heat shield 12 may be secured to the adjacent wall of the building and the device as a whole would preferably be placed upon an insulating mat 13, of asbestos or like material.

A window 14 is preferably provided in the front of the casing to permit observance of the burner, and a opening 15 will preferably be provided in the casing at a point adjacent the pilot light to permit of the ignition of the said pilot light. This opening would preferably be closed by some sort of a close fitting closure, such as the screw-cap 16.

The casing is made of some heat conducting material, such as sheet metal. The heater imparts its heat direct to the surrounding air, and the casing inclosing the heater, by convection, and this heat is then transmitted from the casing to the air within the compartment, by radiation. In this way the compartment is heated without the air or vapors within the compartment coming into contact with the heater itself. All danger of fire or explosion is thus averted, without detracting from the heating efficiency of the heater.

What is claimed, is:

1. A heater for garages and other places likely to contain combustible gases, comprising in combination with a supporting shelf, a flat-bottomed pan resting on said shelf, said pan having a liquid-containing trough extending around the rim thereof so as to leave the central portion of the pan free and unobstructed, a gas heater supported on the central unobstructed portion of the pan, a gas supply pipe extending up through the shelf and through the unobstructed central portion of the pan to the heater, a fresh air inlet pipe extending from a point outside the garage up through the shelf and through the central unobstructed portion of the pan for supplying combustion-supporting air to the heater, a removable hood placed over the heater with its lower edge resting in the trough so as to be sealed by the liquid therein, and an exhaust air conduit connected with the top of the hood and extending to a point outside the garage so as to convey the gases of combustion outside the garage, the said outlet conduit having a detachable connection therein to permit the removal of the hood.

2. A heater for garages and other places likely to contain combustible gases, comprising in combination with a support, a pan resting on said support, said pan having a liquid-containing trough extending around the rim thereof so as to leave the central portion of the pan free and unobstructed, a gas heater supported on the central unobstructed portion of the pan, a gas supply pipe extending up through the support and through the unobstructed central portion of the pan to the heater, a fresh air inlet pipe extending from a point outside the garage up through the support and through the central unobstructed portion of the pan for supplying combustion-supporting air to the heater, a removable hood placed over the heater with its lower edge resting in the trough so as to be sealed by the liquid therein, and an exhaust air conduit connected with the top of the hood and extending to a point outside the garage so as to convey the gases of combustion outside the garage, the said outlet conduit having a detachable connection therein to permit the removal of the hood from the pan.

Signed at New York in the county of New York and State of New York this 7th day of January A. D. 1910.

VAN RENSSELAER LANSINGH.

Witnesses:
   A. C. F. KELEHER,
   E. N. HYDE.